United States Patent
Sato et al.

(10) Patent No.: US 12,400,803 B2
(45) Date of Patent: Aug. 26, 2025

(54) ELECTROLYTIC CAPACITOR

(71) Applicant: Nippon Chemi-Con Corporation, Tokyo (JP)

(72) Inventors: Kenta Sato, Tokyo (JP); Ippei Nakamura, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 187 days.

(21) Appl. No.: 17/910,810

(22) PCT Filed: Mar. 17, 2021

(86) PCT No.: PCT/JP2021/010806
§ 371 (c)(1),
(2) Date: Mar. 7, 2023

(87) PCT Pub. No.: WO2021/193282
PCT Pub. Date: Sep. 30, 2021

(65) Prior Publication Data
US 2023/0197356 A1    Jun. 22, 2023

(30) Foreign Application Priority Data
Mar. 27, 2020 (JP) ................. 2020-058489

(51) Int. Cl.
*H01G 9/145* (2006.01)
*H01G 9/035* (2006.01)
(Continued)

(52) U.S. Cl.
CPC ............ *H01G 9/10* (2013.01); *H01G 9/035* (2013.01); *H01G 9/145* (2013.01); *H01G 9/15* (2013.01)

(58) Field of Classification Search
CPC ......... H01G 9/15; H01G 9/145; H01G 9/035; H01G 9/10
See application file for complete search history.

(56) References Cited

U.S. PATENT DOCUMENTS

| 11,569,042 B2 * | 1/2023 | Inoue ................ H01G 9/10 |
| 2018/0119306 A1 * | 5/2018 | Tsubaki ............. H01G 9/145 |

(Continued)

FOREIGN PATENT DOCUMENTS

| EP | 1958221 A1 | 8/2008 |
| JP | S60-245106 A | 12/1985 |

(Continued)

OTHER PUBLICATIONS

Extended European Search Report issued Sep. 13, 2023, for European Patent Application No. 21776424.0.

(Continued)

*Primary Examiner* — David M Sinclair
(74) *Attorney, Agent, or Firm* — Potomac Law Group, PLLC

(57) ABSTRACT

Provided is an electrolytic capacitor with a resin layer, in which an increase in ESR over time is suppressed. An electrolytic capacitor includes a capacitor element including an anode foil, a cathode foil, and electrolytic solution, a case housing the capacitor element, a sealing member sealing the case, and a resin layer arranged in the vicinity of the sealing member. The resin layer arranged in the vicinity of the sealing member includes epoxy resin composition including ester bond. On the other hand, for the electrolytic solution contained in the electrolytic capacitor, compound with hydroxy group is 45 wt % or less including 0 wt % in solvent.

15 Claims, 1 Drawing Sheet

(51) Int. Cl.
    *H01G 9/10*     (2006.01)
    *H01G 9/15*     (2006.01)

(56) References Cited

U.S. PATENT DOCUMENTS

2018/0218844 A1* 8/2018 Sato ........................ H01G 9/151
2020/0194186 A1* 6/2020 Lin ........................ H01G 9/028

FOREIGN PATENT DOCUMENTS

| | | | |
|---|---|---|---|
| JP | H03-123013 A | 5/1991 | |
| JP | H04-267513 A | 9/1992 | |
| JP | H11-87192 A | 3/1999 | |
| JP | 2019-153702 A | 9/2019 | |
| WO | WO-2018062411 A1 * | 4/2018 | ............ H01G 11/78 |
| WO | WO 2018/123525 A1 | 7/2018 | |
| WO | WO-2019194153 A1 * | 10/2019 | |

OTHER PUBLICATIONS

International Search Report from International Patent Application No. PCT/JP2021/010806, Jun. 1, 2021.
Office Action issued Feb. 4, 2025, in Japanese Patent Application No. 2022-510004.
Office Action issued Nov. 26, 2024, in Korean Patent Application No. 10-2022-7027480.
Office Action issued May 16, 2025, in Chinese Patent Application No. 202180022040.4.

* cited by examiner

ELECTROLYTIC CAPACITOR

FIELD OF INVENTION

The present disclosure relates to an electrolytic capacitor having a resin layer.

BACKGROUND

In electrolytic capacitors utilizing valve action metal such as tantalum and aluminum, etc., by making the valve action metal as the anode electrode into shapes of a sintered body or an etching foil, etc., to enlarge the surface of dielectric, the electrolytic capacitors can be in a small size and have a large capacity. This type of electrolytic capacitor is formed by filling voids with an electrolyte so that the dielectric oxide film of the anode electrode is brought into close contact with the counter electrode. That is, the electrolytic capacitors include liquid electrolytic capacitors having only an electrolytic solution, hybrid electrolytic capacitors having an electrolytic solution and a solid electrolyte, and bipolar electrolytic capacitors having a dielectric film formed on both electrodes.

The electrolytic solution contains ethylene glycol or γ-butyrolactone as a solvent, and contains a carboxylic acid such as 1,6-decandicarboxylic acid, 1,7-octanedicarboxylic acid, or azelaic acid or a salt thereof as a solute. This electrolytic solution comes into direct contact with the dielectric film and acts as a true cathode electrode, and also has a repairing action on the dielectric film. However, evaporation and volatilization occurs, where the electrolytic solution is released outside the electrolytic capacitor over time. Therefore, the capacitance of the electrolytic capacitor decreases over time toward dry-up, and the tangent (tan δ) of the loss angle increases over time, and finally reaching the end of its life.

Accordingly, a capacitor element is inserted into an outer case with bottom, and the opening of the outer case is sealed with a sealing member to seal the electrolytic solution impregnated in the capacitor element, thereby suppressing evaporation and volatilization of the electrolytic solution and extending its life. However, elastomers such as butyl rubber and ethylene propylene diene rubber (EPDM) are used for the sealing member. Therefore, the electrolytic solution is not completely confined within the case, but permeates the sealing member and gradually volatilizes to the outside of the electrolytic capacitor. Therefore, a proposal has been proposed to cover the sealing member with a resin layer to suppress volatilization of the electrolytic solution by permeation through the sealing member, as shown in Patent Document 1.

Resin layers generally have excellent thermal insulation properties. When the thermal insulation property of the electrolytic capacitor is increased, it becomes difficult to dissipate the heat generated in the case, and the heat is easily accumulated. Therefore, the use of ethylene glycol as a solvent of the electrolytic solution has been proposed, as shown in Patent Document 2. This is because the thermal conductivity of ethylene glycol is about twice as large as that of γ-butyrolactone or sulfolane. Although Patent Document 2 suggests that the larger the content ratio of ethylene glycol in the solvent, the higher the thermal conductivity, it is said that the ethylene glycol is preferably 90 mass % or less in order to contain other types of solvents.

PRIOR ART DOCUMENT

Patent Document

Patent Document 1: JP S60-245106 A1
Patent Document 2: WO2018/123525

SUMMARY OF INVENTION

Problems to be Solved by Invention

The resin layer contains a curable resin composition. Examples of the curable resin composition include an epoxy resin compositions containing an epoxy resin and an acid anhydride curing agent. Epoxy resin compositions are compositions of epoxy resins cured with an acid anhydride-base curing agents. The epoxy resin composition containing the acid anhydride curing agent has improved heat resistance, and since the reaction temperature between the epoxy resin and the acid anhydride curing agent is 100° C. or higher, the curing reaction can be accelerated by using the temperature as a trigger. Therefore, it is considered that the epoxy resin composition containing the epoxy resin and the acid anhydride curing agent is suitable for the resin layer.

The present inventors covered a part of the electrolytic capacitor with a resin with the epoxy resin cured with the acid anhydride curing agent. Then, this electrolytic capacitor was exposed to a temperature environment of 150° C. Then, it was confirmed that the ESR of the electrolytic capacitor exposed to this temperature environment for 400 hours was significantly increased.

The present disclosure has been proposed to solve the above problems, an object of the present disclosure is to provide an electrolytic capacitor with a resin layer, in which an increase in ESR over time is suppressed.

Solution to the Problems

As a result of their diligent research, the present inventors have found that the increase in ESR over time in the electrolytic capacitor is unique when a resin layer is formed with an epoxy resin composition containing an epoxy resin and an acid anhydride curing agent (hereinafter referred to as acid anhydride-cured epoxy resin) and ethylene glycol is used as the solvent in the electrolytic solution.

As a result of a diligent research based on this knowledge, the present inventors have found since the acid anhydride-cured epoxy resin reacts with water or ethylene glycol and eluted into the electrolytic solution, the presence of the acid anhydride-cured epoxy resin in the electrolytic solution was the cause of the increase in ESR of the electrolytic capacitor. Acid anhydride-cured epoxy resins contain ester bonds in their chemical structure. On the other hand, even when water is not intentionally added to the electrolytic capacitor, a small amount of water is mixed into the electrolytic capacitor during the manufacturing process. Ethylene glycol is a compound with a hydroxy group, and the compound with a hydroxy group has a structure that is easily accessible to water. Therefore, when the compound with a hydroxy group permeates the sealing member, water also permeates with it, and the ester bond of the acid anhydride-cured epoxy resin reacts with water, and the acid anhydride-cured epoxy resin is hydrolyzed. In addition, an esterification reaction between a carbonyl group produced by hydrolysis and a compound with a hydroxy group also occurs. As described above, it is considered that a part of the acid anhydride-cured epoxy resin component that reacted with water or the compound with a hydroxy group permeated the sealing member and eluted into the electrolytic solution.

Moreover, as a result of diligent research, the present inventors found that the hydrolysis of the epoxy resin composition with an ester bond and its elution into the electrolytic solution can be solved by reviewing the amount of the compound with hydroxy group present in the overall solvent.

The present disclosure has been made based on these finding, and a electrolytic capacitor of the present disclosure includes a capacitor element including an anode foil, a cathode foil, and electrolytic solution, a case housing the capacitor element, a sealing member sealing the case, and a resin layer arranged in the vicinity of the sealing member, in which the resin layer include ester bond and epoxy resin composition, and an amount of compounds with hydroxy group is 45 wt % or less including 0 wt % in solvent of the electrolytic solution.

The epoxy resin composition may use an epoxy resin and an acid anhydride curing agent as raw materials.

The epoxy resin composition may have a chemical structure containing an epoxy resin and an acid anhydride curing agent.

An amount of compounds with hydroxy group may be 10 wt % or more in the solvent of the electrolytic solution.

The compound with hydroxy group may be ethylene glycol, diethylene glycol, or polyethylene glycol.

The electrolytic solution may contain 35 wt % or more of sulfolane with respect to the total amount of the solvent of the electrolytic solution.

The capacitor element may further comprise a solid electrolyte.

Cationic component in the electrolytic solution may be contained in an amount of 76 mmol or less per 100 g of the electrolytic solution. Cationic component in the electrolytic solution may be contained in an amount of 25 mmol or less per 100 g of the electrolytic solution.

Effects of Disclosure

According to the present disclosure, an electrolytic capacitor with a resin layer, in which an increase in ESR over time is suppressed, can be provided.

DETAILED DESCRIPTION

Figure 1:
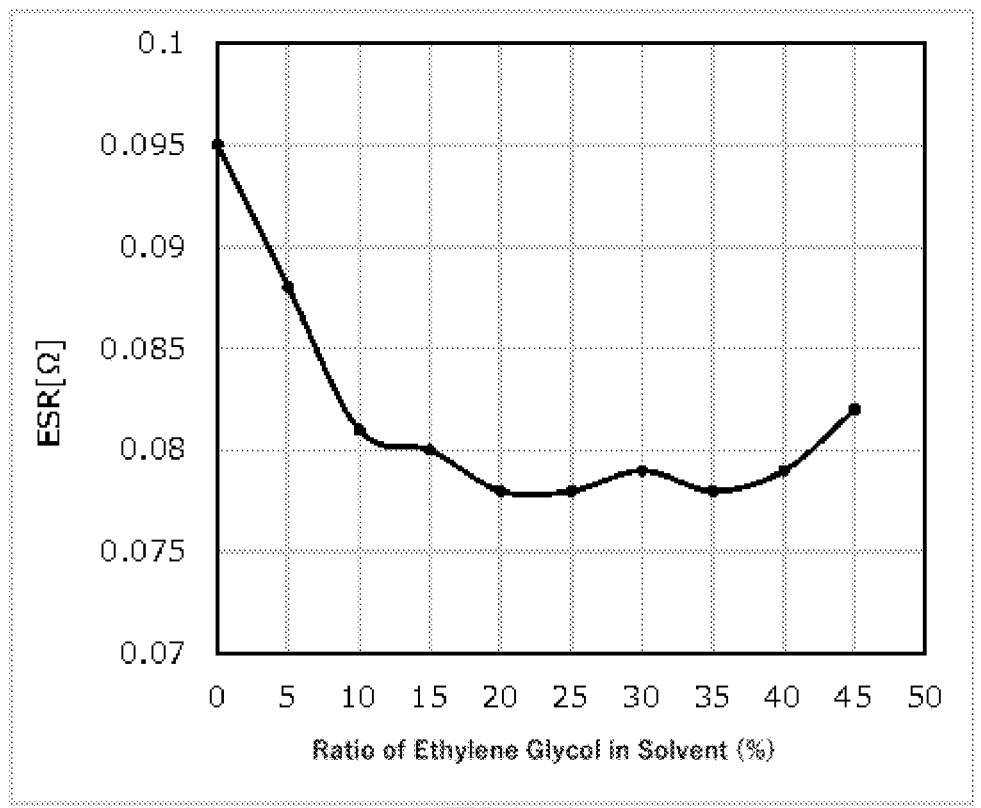
FIG. 1 is a graph showing the relationship between the ratio of ethylene glycol and ESR.

Hereinafter, the electrolytic capacitor according to the embodiment of the present disclosure will be described. The present disclosure is not limited to the following examples.
(Overall Configuration)

The electrolytic capacitor is a passive element that stores and discharges electric charges according to the capacitance. This electrolytic capacitors include liquid electrolytic capacitors having only an electrolytic solution, and hybrid electrolytic capacitors in which a solid electrolyte such as a conductive polymer or gel and an electrolytic solution are used in combination. These electrolytic capacitors include electrolytic capacitors with dielectric oxide film intentionally formed only on the anode electrode side and bipolar electrolytic capacitors with dielectric oxide film formed on both electrodes. Furthermore, these electrolytic capacitors include electrolytic capacitors with lead terminals drawn out in appearance, electrolytic capacitors that are surface-mounted on a board with a base, and electrolytic capacitors that are entirely covered with resin along with other electronic circuit components. These various combinations of electrolytic capacitors are hereinafter collectively referred to simply as electrolytic capacitors.

Electrolytic capacitors have a capacitor element, a case, and a sealing member. The case houses the capacitor element. The sealing member is attached to an opening of the case by a crimping process to seal the opening of the case. The capacitor element has an anode foil, a cathode foil, a separator, and electrolytic solution. The anode foil and the cathode foil face each other via a separator. A dielectric oxide film layer is formed on the surface of the anode foil. A dielectric oxide film layer is also formed on the cathode foil, if necessary. Electrolyte includes electrolytic solution. In addition to the electrolytic solution, solid electrolytes may be included. The solid electrolyte is interposed between the anode foil and the cathode foil, and is in close contact with the dielectric oxide film layer. The electrolytic solution fills voids of the capacitor element. Electrolytic capacitors may also have a base if necessary.
(Sealing Member)

The sealing member is attached to the case by a crimping process. The case is made of aluminum, aluminum alloy containing aluminum or manganese, or stainless steel, and is a cylinder, for example, with a bottom and an opening at the other end. In the crimping process, the opening of the case is bent inward and collapsed to tightly fit the case to the sealing member. The sealing member with elastic force is a plate body made of an elastomer, or a plate body in which a synthetic resin plate or a metal plate is laminated on the elastomer. The elastomer adheres closely, by elastic force, to the case which the crimping process has been performed, and maintains airtightness in the case. However, permeability to volatilized electrolytic solution of sealing members containing elastomer is not zero. These elastomers include butyl rubber, ethylene propylene diene rubber (EPDM), silicone rubber, and butyl rubber.
(Resin Layer)

The electrolytic capacitor further includes a resin layer. The resin layer suppresses the transpiration of the electrolytic solution. That is, it may be provided at any location of the electrolytic capacitor as long as it is in the vicinity of the sealing member through which the electrolytic solution may pass. For example, the resin layer covers at least a partial area of the surface of the sealing member. This resin layer covers the sealing member by resin molding, and reduces the permeability through which the electrolytic solution permeates the sealing member. That is, vicinity does not have to be spaced apart and includes contact arrangements.

Further, for example, when the electrolytic capacitor is a chip type provided with a base, the resin layer is provided, for example, at or around a place where the base and the case come into contact with each other and near the sealing member. Transpiration of the electrolytic solution that permeates the sealing body is suppressed by this resin layer. In other words, this resin layer may also react with water or ethylene glycol in the electrolytic solution that has passed through the sealing body and elute into the electrolytic solution through the sealing body.

This resin layer is made of an acid anhydride-cured epoxy resin. The resin layer may contain a compound other than the acid anhydride-cured epoxy resin. The acid anhydride-cured epoxy resin is an epoxy resin composition with an epoxy resin and an acid anhydride curing agent as raw materials, containing the epoxy resin and the acid anhydride curing agent in a chemical structure, being made by curing the epoxy resin with the acid anhydride-based curing agent. In addition, this acid anhydride-cured epoxy resins contain ester bonds in their chemical structure.

Specifically, a monoester is generated by reacting a hydroxy group or the like present in the epoxy resin with an acid anhydride group of the acid anhydride curing agent, and then the generated carboxyl group reacts with epoxy group to generate a diester, and at the same time, hydroxyl group is also generated, which reacts with the next acid anhydride group, and the acid anhydride-cured epoxy resin is generated by the progress of such a sequential reaction. Therefore, this acid anhydride-cured epoxy resins have ester bonds in their chemical structure.

As can be seen from this reaction system, the epoxy resin composition containing the epoxy resin and the acid anhydride curing agent in the chemical structure does not mean the epoxy resin composition incorporated into the chemical structure in the same state as before the reaction. The inclusion of the epoxy resin and the acid anhydride curing agent in the chemical structure means that each group is substituted for binding and then incorporated into the chemical structure.

The epoxy resin contained in the acid anhydride-cured epoxy resin is an epoxy oligomer having two or more reactive epoxy group at the ends. This epoxy resin transforms from a liquid substance to a solid resin by bridging between the epoxy resins through the addition reaction of the acid anhydride curing agent. Epoxy resins typically include bisphenol-A diglycidyl ether, which is a condensate of bisphenol A and epichlorohydrin. Examples of the epoxy resin include other glycidyl-type epoxy resins and alicyclic epoxisides such as 3,4-epoxycyclohexylmethyl-3',4'-epoxy-cyclohexanecarboxylate.

Examples of the glycidyl-type epoxy resin include bisphenol type obtained by glycidylating bisphenols. Examples of bisphenols include bisphenol A, bisphenol F, bisphenol AD, bisphenol S, tetramethylbisphenol A, tetramethylbisphenol F, tetramethylbisphenol AD, tetramethylbisphenol S, tetrabromobisphenol A, tetrachlorobisphenol A, and tetrafluorobisphenol A.

In addition, examples of the glycidyl-type epoxy resin include epoxy resin obtained by glycidylating divalent phenols. Examples of divalent phenols include biphenol, dihydroxynaphthalene, and 9,9-bis(4-hydroxyphenyl)fluorene, and the like.

In addition, examples of the glycidyl-type epoxy resin include epoxy resin obtained by glycidylating trisphenols. Examples of triphenols include 1,1,1-tris(4-hydroxyphenyl) methane and 4,4-(1-(4-(1-(4-hydroxyphenyl)-1-methyl-ethyl)phenyl)ethylidene)bisphenol, and the like.

In addition, examples of the glycidyl-type epoxy resin include epoxy resin obtained by glycidylating tetrakisphenols. Examples of tetrakisphenols include 1,1,2,2-tetrakis(4-hydroxyphenyl)ethane, and the like.

In addition, examples of the glycidyl-type epoxy resin include novolak-type epoxy resin obtained by glycidylating novolaks. Examples of the novolaks include phenol novolak, cresol novolak, bisphenol A novolak, brominated phenol novolak, brominated bisphenol A novolak, and the like.

In addition, examples of the glycidyl-type epoxy resin include epoxy resin obtained by glycidylating polyhydric phenols, and aliphatic-ether-type eoxy resin obtained by glycidylating polyhydric alcohols such as glycerin and polyethylene glycol.

In addition, examples of the glycidyl-type epoxy resin include ether-ester-type epoxy resin obtained by glycidylating hydroxy carboxylic acid, ester-type epoxy resin obtained by glycidylating polycarboxylic acid, glycidylated amine compounds, and amine-type epoxy resin. Examples of hydroxy carboxylic acids include p-oxybenzoic acid and β-oxynaphthoic acid, and the like. Examples of polycarboxylic acids include phthalic acid, terephthalic acid, and the like. Examples of amine compounds include 4,4-diaminodiphenylmethane and m-aminophenol. Examples of the amine-type epoxy resin include triglycidyl isocyanurate, and the like.

Examples of the acid anhydride curing agents contained in the acid anhydride-cured epoxy resin include phthalic anhydride, tetrahydro phthalic anhydride, hexahydro phthalic anhydride, methyl tetrahydro phthalic anhydride, methyl hexahydro phthalic anhydride, methylnadiric anhydride, succinic anhydride, dodecenyl succinic anhydride, chloric anhydride, maleic anhydride, dichloro maleic anhydride, and the like. In addition, the acid anhydride curing agent may be an aromatic polyvalent carboxylic acid anhydride or a styrene-maleic anhydride copolymer.

(Capacitor Element)
(Electrolytic Solution)

The electrolytic solution impregnated in the capacitor element is a solution of an ion dissociative salt that dissociates into an anionic component and a cationic component, or a solvent that does not contain an ion dissociative salt. In the solvent, the percentage of compounds with hydroxy group present is 45 wt % or less, including 0 wt % with respect to the total solvent. 0 wt % is included and compounds with hydroxy group may not be contained in the solvent. Preferably, the compound with hydroxy group is more than 10 wt % with respect to the total solvent.

Examples of compounds with hydroxy group include protic organic polar solvents. Examples of the protic organic polar solvents include monohydric alcohols, polyhydric alcohols, and oxyalcohol compounds. Examples of the monohydric alcohols include ethanol, propanol, butanol, pentanol, hexanol, cyclobutanol, cyclopentanol, cyclohexanol, benzyl alcohol, and the like. Examples of the polyhydric alcohols and the oxyalcohol compounds include ethylene glycol, diethylene glycol, propylene glycol, glycerin, methyl cellosolve, ethyl cellosolve, methoxypropylene glycol, dimethoxypropanol, alkylene oxide adducts of polyhydric alcohols such as polyethylene glycol and polyoxyethylene glycerin, and the like.

When the ratio of the compounds with hydroxy group is 45 wt % or less with respect to the total solvent, even if an epoxy resin with ester bonds such as the acid anhydride-cured epoxy resin is used for the resin layer, the rise of ESR of the electrolytic capacitor over time is suppressed.

The sudden change in ESR with a boundary of 45 wt % is speculative and is not limited to this mechanism, but can be considered as follows. First, the acid anhydride-cured epoxy resin reacts with water and is hydrolyzed. In addition, dehydration condensation occurs as a reverse reaction of hydrolysis. Hydrolysis and dehydration condensation are reversible reactions and therefore maintain an equilibrium state. However, in addition to the hydrolysis and dehydration condensation reactions, an esterification reaction occurs between the carbonyl group produced by the hydrolysis and the compound with the hydroxy group. This esterification reaction disrupts the equilibrium between hydrolysis and dehydration condensation and accelerates the hydrolysis reaction. As a result, these epoxy resins decompose and elute into the electrolytic solution, increasing the ESR of the electrolytic capacitor. However, when the ratio of the compound with the hydroxy group is 45 wt % or less with respect to the total solvent, the esterification reaction does not occur so rapidly as to promote the hydrolysis, and it is considered that the equilibrium state of hydrolysis and dehydration condensation is less likely to be unbalanced.

In addition, when the ratio of the compounds with hydroxy group is within the range of between 10 wt % or more and 45 wt % or less with respect to the total solvent, the rise of ESR of the electrolytic capacitor over time is further suppressed, which is preferred. When the solid electrolyte is used in combination with an electrolytic solution containing a compound with the hydroxy group such as ethylene glycol as a solvent, it is considered that the conductive polymer's electrical conductivity is improved by a change in the higher-order structure of the conductive polymer and reorientation of the crystal structure of the polymer chain if it is 10 wt % or more with respect to the total solvent. This effect cannot be obtained with γ-butyrolactone.

The solvent may be composed of a nonprotic organic polar solvent as well as a compound with the hydroxy group. Typical examples of the aprotic organic polar solvents include sulfone-based, amide-based, lactones, cyclic amide-based, nitrile-based, and sulfoxide-based solvents. Examples of the sulfone-based include dimethyl sulfone, ethyl methyl sulfone, diethyl sulfone, sulfolane, 3-methyl sulfolane, 2,4-dimethyl sulfolane and the like. Examples of the amide-based include N-methylformamide, N, N-dimethylformamide, N-ethylformamide, N, N-diethylformamide, N-methylacetamide, N, N-dimethylacetamide, N-ethylacetamide, N, N-diethylacetamide and hexamethylphosphoricamide and the like. Examples of the lactones and the cyclic amide-based include γ-butyrolactone, γ-valerolactone, 5-valerolactone, N-methyl-2-pyrrolidone, ethylene carbonate, propylene carbonate, butylene carbonate, isobutylene carbonate and the like. Examples of the nitrile-based include acetonitrile, 3-methoxypropionitrile, glutaronitrile and the like. Examples of the sulfoxide-based include dimethyl sulfoxide and the like.

Sulfolane is particularly preferred among these. Sulfolane has a high boiling point, making it difficult for the solvent to transpiration, thus extending the life of electrolytic capacitors. In addition, there is no ether bond in sulfolane. For example, it can be said that sulfolane has a structure that is inaccessible to water as compared with a compound having ether bond such as γ-butyrolactone. Therefore, even compared to the compound with ether bond, sulfolane does not attract water when it permeates the sealing member, and it is further suppressed that a part of the acid anhydride-cured epoxy resin component permeates the sealing member and elutes into the electrolytic solution. Comparing the compound with ether bond and the compound with hydroxy group, the compound with hydroxy group is far easier to approach water.

When sulfolane is used as a solvent for a mixture of two compounds with a compound having hydroxy group such as ethylene glycol, the ratio of sulfolane in the solvent is preferably 55 wt % or more and less than 100 wt %, and more preferably 55 wt % or more and 90 wt % or less. In addition, from the viewpoint of further suppressing the elution of a part of the acid anhydride-cured epoxy resin component in the electrolytic solution, the ratio of sulfolane in the solvent is preferably 35 wt % or more.

Examples of organic acids that become anionic components as solute include oxalic acid, succinic acid, glutaric acid, pimelic acid, suberic acid, sebacic acid, phthalic acid, isophthalic acid, terephthalic acid, maleic acid, adipic acid, benzoic acid, toluyl acid, enanthic acids, malonic acids, carboxylic acids such as 1,6-decandicarboxylic acid, 1,7-octanedicarboxylic acid, azelaic acid, resolcinic acid, fluorochloric acid, gallic acid, gentisic acid, protocatechuic acid, pyrocatechuic acid, trimellitic acid, and pyromellitic acid, phenols, and sulfonic acids. Examples of the inorganic acid include boric acid, phosphoric acid, phosphorus acid, hypophosphorous acid, carbonic acid, silicic acid, and the like. Examples of complex compounds of organic and inorganic acids include borodisalicylic acid, borodioxalic acid, borodiglycolic acid, borodimalonic acid, borodichuccinic acid, borodiadipic acid, borodiazelaic acid, borodibenzoic acid, borodimarainic acid, borodilactic acid, borodiapple acid, borodi tartric acid, borodicitrate acid, borodiphthalic acid, borodi (2-hydroxy) isobutyric acid, borodiresorcinic acid, borodimethylsalicylic acid, borodinaftoeic acid, borodimandelic acid and borodi (3-hydroxy) propionic acid, and the like.

Further, examples of at least one salt of the organic acid, the inorganic acid, and the complex compound of the organic acid and the inorganic acid include ammonium salts, quaternary ammonium salts, quaternary amidinium salts, amine salts, sodium salts, and potassium salts, and the like. Examples of the quaternary ammonium ion of the quaternary ammonium salts include tetramethylammonium, triethylmethylammonium, tetraethylammonium, and the like. Examples of the quaternary amidinium salts include ethyldimethylimidazolinium and tetramethylimidazolinium, and the like. Examples of the amine salts include primary amines, secondary amines, and tertiary amines. Examples of the primary amines include methylamine, ethylamine, propylamine, and the lile, examples of the secondary amines include dimethylamine, diethylamine, ethylmethylamine and dibutylamine, and the like, and examples of the tertiary amines include trimethylamine, triethylamine, tributylamine, ethyldimethylamine, and ethyldiisopropylamine, and the like.

The cationic component of the solute is preferably added in an amount of 76 mmol or less per 100 g of the electrolytic solution, further preferably 51 mmol or less per 100 g of the electrolytic solution, more preferably 34 mmol or less per 100 g of the electrolytic solution, particularly preferably 25 mmol or less per 100 g of the electrolytic solution, and most preferably 17 mmol or less per 100 g of the electrolytic solution. The ratio of the cationic and anionic components of the solute may be equimolecular amount, or there may be an excess of the cationic component or an excess of the anionic component.

The cationic component tends to promote the dedoping reaction of the conductive polymer in the solid electrolyte in a high thermal environment such as a reflow process when mounting the electrolytic capacitor. When the dedoping reaction is promoted by the cationic component, the electrical conductivity of the solid electrolyte decreases and the ESR of the electrolytic capacitor increases. On the other hand, when the resin layer is arranged in the vicinity of the sealing member, the resin layer inhibits the transpiration of the cationic component through the sealing member, and the decrease of the cationic component in the electrolytic capacitor is suppressed. Therefore, when the resin layer is arranged in the vicinity of the sealing member, dedoping reactions due to the cationic component occur frequently, and the ESR of the electrolytic capacitor increases.

However, if the amount of the cationic component of the solute in the electrolytic solution is 76 mmol or less per 100 g of the electrolytic solution, the increase in ESR is suppressed as compared with the case where the amount exceeds 76 mmol. Furthermore, if the amount of the cationic component of the solute in the electrolytic solution is 51 mmol or less per 100 g of the electrolytic solution, the increase in ESR is dramatically reduced compared with the case where the amount is 76 mmol per 100 g of the electrolytic solution. If the amount of the cationic component of the solute in the electrolytic solution is 25 mmol or less per 100 g of the electrolytic solution, the increase in ESR is further dramatically reduced compared with the case where the amount is 51 mmol per 100 g of the electrolytic solution.

Further, other additives may be added to the liquid. Examples of additives include complex compounds of boric acid and polysaccharides (mannit, sorbit, etc.), complex compounds of boric acid and polyhydric alcohol, borate esters, nitro compounds (o-nitrobenzoic acid, m-nitrobenzoic acid, p-nitrobenzoic acid, o-nitrophenol, m-nitrophenol, p-nitrophenol, p-nitrobenzylalcohol etc.), phosphate esters, and the like. These may be used alone, or two or more kinds may be combined.

(Electrode Foil)

The anode foil and the cathode foil is a long foil body made of a valve acting metal. The valve acting metal is aluminum, tantalum, niobium, niobium oxide, titanium, hafnium, zirconium, zinc, tungsten, bismuth, antimony and the like. The purity is preferably 99.9% or more for the anode foil and is preferably about 99% or more for the cathode foil, however impurities such as silicon, iron, copper, magnesium, and zinc may be contained.

The surface of the anode foil is enlarged as a sintered body obtained by sintering powder of a valve action metal or an etching foil obtained by etching a stretched foil. The enlarged surface structure is formed with tunnel-shaped etching pits, sponge-shaped etching pits, or voids between dense powders. Typically, the enlarged surface structure is formed by direct current etching or alternating current etching in which direct current or alternating current is applied in an acidic aqueous solution containing halogen ions such as hydrochloric acid, or is formed by depositing or sintering metal particles or the like on the core. The cathode foil may also have the enlarged surface structure by deposition, sintering or etching.

A dielectric oxide film is typically an oxide film formed on the surface layer of the anode foil, and when the anode foil is made of aluminum, it is an aluminum oxide obtained by oxidizing a porous structural region. This dielectric oxide film is formed by a chemical conversion treatment in which a voltage is applied in an aqueous solution of adipic acid, boric acid or phosphoric acid, and the like. Further, a thin dielectric oxide film (about 1 to 10 V) may be formed on the surface layer of the cathode foil by chemical conversion treatment, if necessary. In addition, the dielectric oxide film may be formed by vapor deposition of a layer consisting of metal nitride, metal carbide, or metal carbonitride, or may be produced by using material containing carbon on the surface.

(Separator)

Separator includes celluloses such as kraft, Manila hemp, esparto, hemp, and rayon, and mixed papers thereof, polyester resins such as polyethylene terephthalates, polybutylene terephthalates, polyethylene naphthalates, and derivatives thereof, polytetrafluoroethylene resins, polyvinylidene fluoride resin, vinylon resin, aliphatic polyamide, semi-aromatic polyamide, polyamide resin such as total aromatic polyamide, polyimide resin, polyethylene resin, polypropylene resin, trimethylpentene resin, polyphenylene sulfide resin, acrylic resin, polyvinyl alcohol resin and the like, these resins may be used alone or in combination.

(Solid Electrolyte)

When the solid electrolyte is formed in the capacitor element, the solid electrolyte contains a conductive polymer. The conductive polymer is a conjugated polymer or a doped conjugated polymer. The conjugated polymer is obtained by chemical oxidative polymerization or oxidative electropolymerization a monomer having a π-conjugated double bond or a derivative thereof. Conductivity is exhibited by adding a small amount of an acceptor that easily accepts electrons or a donor that easily donates electrons to the conjugated polymer. When the acceptor or the donor is added to the conjugated polymer, n electrons are extracted from the conjugated polymer to form negative charge carrier (positive holes, holes) in the case of the acceptor, and electrons are supplied to form negative charge carrier in the case of a donor, and exhibits conductivity.

As conjugated polymers, known polymers can be used without limitation. Examples include polypyrrole, polythiophene, polyfuran, polyaniline, polyacetylene, polyphenylene, polyphenylenevinylene, polyacene, and polythiophenevinylene, and the like. These conjugated polymers may be used alone, or two or more kinds may be combined, furthermore, it may be a copolymer of two or more monomers.

Among the above-mentioned conjugated polymers, a conjugated polymer obtained by polymerizing thiophene or a derivative thereof is preferable, and conjugated polymers polymerized with 3,4-ethylenedioxythiophene (that is, 2,3-dihydrothieno[3,4-b][1,4]Dioxin), 3-alkylthiophene, 3-alkoxythiophene, 3-alkyl-4-alkoxythiophene, 3,4-alkylthiophene, 3,4-alkoxythiophene, or derivatives thereof are preferred. Examples of the thiophene derivatives, a compound selected from thiophene with substituents at the 3- and 4-positions is preferable, and the 3- and 4-position substituents of the thiophene ring may form a ring together with the 3- and 4-position carbons. The number of carbons of alkyl and alkoxy groups is suitable to being from 1 to 16, in particular, a polymer of 3,4-ethylenedioxythiophene, called EDOT, i.e., poly(3,4-ethylenedioxythiophene), called PEDOT, is particularly preferred. Further, an alkylated ethylenedioxythiophene in which an alkyl group is added to 3,4-ethylenedioxythiophene may be used, and for example, a methylated ethylenedioxythiophene (that is, 2-methyl-2,3-dihydro-thieno[3,4-b][1,4]dioxin), ethylated ethylenedioxythiophene (that is, 2-ethyl-2,3-dihydro-thieno[3,4-b][1,4]dioxine), and the like cab be mentioned.

As dopant, known dopant can be used without limitation. For example, inorganic acids such as boric acid, nitrate and phosphoric acid, organic acids such as acetic acid, oxalic acid, citric acid, ascot acid, tartaric acid, squaric acid, logisonic acid, croconic acid, salicylic acid, p-toluenesulfonic acid, 1,2-dihydroxy-3,5-benzenedisulfonic acid, methanesulfonic acid, trifluoromethanesulfonic acid, borodisalicylic acid, bisoxalate borate acid, sulfonylimide acid, dodecylbenzenesulfonic acid, propylnaphthalenesulfonic acid, butylnaphthalenesulfonic acid can be mentioned. Examples of polyanions include polyvinyl sulfonic acid, polystyrene sulfonic acid, polyallyl sulfonic acid, polyacrylic sulfonic acid, polymethacrylic sulfonic acid, poly(2-acrylamide-2-methylpropanesulfonic acid), polyisoprene sulfonic acid, and polyacrylic acid, polymethacrylic acid, polymaleic acid and the like.

These dopants may be used alone, or two or more kinds may be combined. In addition, these dopants may be polymers of a single monomer or a copolymers of two or more monomers. Dopants may also be polymers or monomers.

EXAMPLES

Examples 1 to 11

Hereinafter, the electrolytic capacitor of the present invention will be described in more detail based on Examples. The present invention is not limited to the following examples. Various types of electrolytic capacitors were manufactured by coating the sealing member with a resin layer containing an acid anhydride-cured agent epoxy resin. The electrolytic capacitors of Comparative Examples 1 to 3 and Examples 1 to 11 have an electrolyte in which an electrolytic solution and a solid electrolyte are used in combination, and ratios of ethylene glycol in solvent of the electrolytic solution is different. Acid anhydride-cured agent epoxy resins are examples of epoxy resins with ester bonds, and ethylene glycol is an example of a compound with hydroxy groups.

The common points of the electrolytic capacitors of Comparative Examples 1 to 3 and Examples 1 to 11 are as follows. The anode foil is an aluminum foil, which surface is enlarged by an etching process and dielectric oxide film is formed by a chemical conversion treatment. The cathode foil was a plain foil, i.e., unetched aluminum foil. The same anode foils and cathode foils were used for all electrolytic capacitors, with lead wires connected to each, and the anode foils and cathode foils were wound facing each other through a manila-based separator. The capacitor elements ware performed with restorative conversion by immersed in an aqueous solution of ammonium dihydrogen phosphate of the same concentration for 10 minutes.

Next, a dispersion of polyethylene dioxythiophene (PEDOT/PSS) doped with polystyrene sulfonic acid of the same product as a conductive polymer was prepared at the same concentration, the capacitor elements were immersed, the capacitor element were pulled up and dried at 150° C. for 30 minutes. The immersing and drying were repeated the same number of times. As a result, the solid electrolytes were formed on the capacitor elements. Next, a different electrolytic solution was prepared for each electrolytic capacitor, and the capacitor element on which the solid electrolyte was formed was immersed in the electrolytic solution. Each capacitor element was inserted into a bottomed cylindrical outer case of the same metal type, the same size, and the same shape, a sealing member was attached to the end of the opening and sealed by crimping process with the same pressing force. The sealing member made of butadiene rubber was used for each electrolytic capacitor.

Each electrolytic capacitor was housed in an aluminum container of the same size, and a resin layer was formed so as to be completely embedded with the same type of epoxy resin. However, the lead wire drawn from the electrolytic capacitor was drawn from the epoxy resin so that the electrolytic capacitor could be energized. The main agent of the epoxy resin poured into the container is bisphenol A type liquid epoxy resin, and the curing agent is tetrahydromethylphthalic anhydride, which is an acid anhydride type. As a result, in each electrolytic capacitor, the outer surface of the sealing member is completely covered with the acid anhydride-cured epoxy resin.

The electrolytic solution prepared in the electrolytic capacitors of Comparative Examples 1 to 3 and Examples 1 to 11 are shown in Table 1 below.

TABLE 1

| | Composition of Electrolytic Solution | | | |
| --- | --- | --- | --- | --- |
| | Ethylene Glycol (EG) | γ-Butyrolactone (GBL) | Sulfolane (TMS) | Solute |
| Comparative Example 1 | 100 | 0 | 0 | not added |
| Comparative Example 2 | 75 | 0 | 25 | not added |
| Comparative Example 3 | 50 | 0 | 50 | not added |
| Example 1 | 45 | 0 | 55 | not added |
| Example 2 | 40 | 0 | 60 | not added |
| Example 3 | 35 | 0 | 65 | not added |
| Example 4 | 30 | 0 | 70 | not added |
| Example 5 | 25 | 0 | 75 | not added |
| Example 6 | 20 | 0 | 80 | not added |
| Example 7 | 15 | 0 | 85 | not added |
| Example 8 | 10 | 0 | 90 | not added |
| Example 9 | 5 | 0 | 95 | not added |
| Example 10 | 0 | 0 | 100 | not added |
| Example 11 | 0 | 100 | 0 | not added |

In Table 1 above, solvent composition ratios are weight percentages of total solvents. As shown in Table 1 above, each electrolytic capacitor has a different solvent composition and composition ratio of the electrolytic solution. The electrolytic solution contained in the electrolytic capacitors of Comparative Examples 1 to 3 contains ethylene glycol in an amount of 50 wt % or more with respect to the total amount of the solvent. In the electrolytic solution contained in the electrolytic capacitors of Examples 1 to 10, ethylene glycol is in the range of 0 wt % to 45 wt % with respect to the total amount of the solvent, and the amount of ethylene glycol is different in 5 wt % increments.

In the electrolytic solutions of the electrolytic capacitors of Comparative Examples 2 and 3 and Examples 1 to 10, the rest of the solvent other than ethylene glycol was sulfolane. Ethylene glycol was not used as the electrolytic solution of the electrolytic capacitor of Example 11, and γ-butyrolactone was used instead of the total amount of the solvent being sulfolane in Example 10. In the electrolytic capacitors of Comparative Examples 1 to 3 and Examples 1 to 11, no solute was added from the viewpoint of clarifying the influence of only the solvent of the electrolytic solution.

After filling each electrolytic capacitor with an acid anhydride-cured epoxy resin, the electrolytic capacitor was left as it is for 400 hours in a temperature environment of 150° C. while applying a constant voltage of 35 V to each electrolytic capacitor.

The ESR before and after this heat stress load were measured. ESR was measured at 100 kHz. In addition, the inside of each electrolytic capacitor after being loaded with heat stress was photographed with an X-ray imaging device, and the internal state was observed by a fluoroscopic image.

Table 2 below shows the results of ESR and the internal state of each electrolytic capacitor by fluoroscopic images before and after the heat stress load.

TABLE 2

| | Composition of Electrolytic Solution | | | | | ESR | |
| --- | --- | --- | --- | --- | --- | --- | --- |
| | Ethylene Glycol (EG) | γ-Butyrolactone (GBL) | Sulfolane (TMS) | Solute | Observation results with X-ray device | Initial ESR (Ω) | after load test (Ω) |
| Comparative Example 1 | 100 | 0 | 0 | not added | cracked | 0.066 | 5.52 |
| Comparative Example 2 | 75 | 0 | 25 | not added | cracked | 0.065 | 3.32 |
| Comparative Example 3 | 50 | 0 | 50 | not added | cracked | 0.066 | 7.35 |
| Example 1 | 45 | 0 | 55 | not added | Unchanged | 0.066 | 0.082 |
| Example 2 | 40 | 0 | 60 | not added | Unchanged | 0.066 | 0.079 |
| Example 3 | 35 | 0 | 65 | not added | Unchanged | 0.068 | 0.078 |
| Example 4 | 30 | 0 | 70 | not added | Unchanged | 0.068 | 0.079 |
| Example 5 | 25 | 0 | 75 | not added | Unchanged | 0.069 | 0.078 |
| Example 6 | 20 | 0 | 80 | not added | Unchanged | 0.068 | 0.078 |
| Example 7 | 15 | 0 | 85 | not added | Unchanged | 0.071 | 0.08 |
| Example 8 | 10 | 0 | 90 | not added | Unchanged | 0.069 | 0.081 |
| Example 9 | 5 | 0 | 95 | not added | Unchanged | 0.07 | 0.088 |
| Example 10 | 0 | 0 | 100 | not added | Unchanged | 0.075 | 0.095 |
| Example 11 | 0 | 100 | 0 | not added | Unchanged | 0.085 | 0.099 |

A graph showing the relationship between the ethylene glycol ratio and the ESR based on the ESR after the heat stress load in Table 2 is illustrated in FIG. 1. Since the ESRs of the groups of Examples 1 to 11 and the groups of Comparative Examples 1 to 3 are in the different magnitude, only the data of the electrolytic capacitors of Examples 1 to 10 are plotted in FIG. 1. As shown in FIG. 1 and Table 2, the ESRs of the groups of Examples 1 to 11 and the groups of Comparative Examples 1 to 3 are in the different magnitude. The groups of Examples 1 to 11 were suppressed to an ESR of at least 1/35 and a maximum of 1/94 ESR as compared with the groups of Comparative Examples 1 to 3.

As a result, it was confirmed that ESR was suppressed by suppressing the ratio of ethylene glycol in the solvent to 45 wt % or less. Further, as shown in FIG. 1, when the ratio of ethylene glycol in the solvent is less than 10 wt %, although it is not a steep increase in the range of 45 wt % or more and 100 wt % or less, the ESR tends to increase, so it was confirmed that ethylene glycol is preferably 10 wt % or more. In particular, when ethylene glycol is present in the solvent while using the solid electrolyte as the electrolyte, the electrical conductivity of the conductive polymer is improved by changing of the higher-order structure of the conductive polymer and reorienting of the crystal structure of the polymer chain, however, since such an effect cannot be obtained with γ-butyrolactone, the ratio of ethylene glycol is preferably 10 wt % or more.

Figure 2:
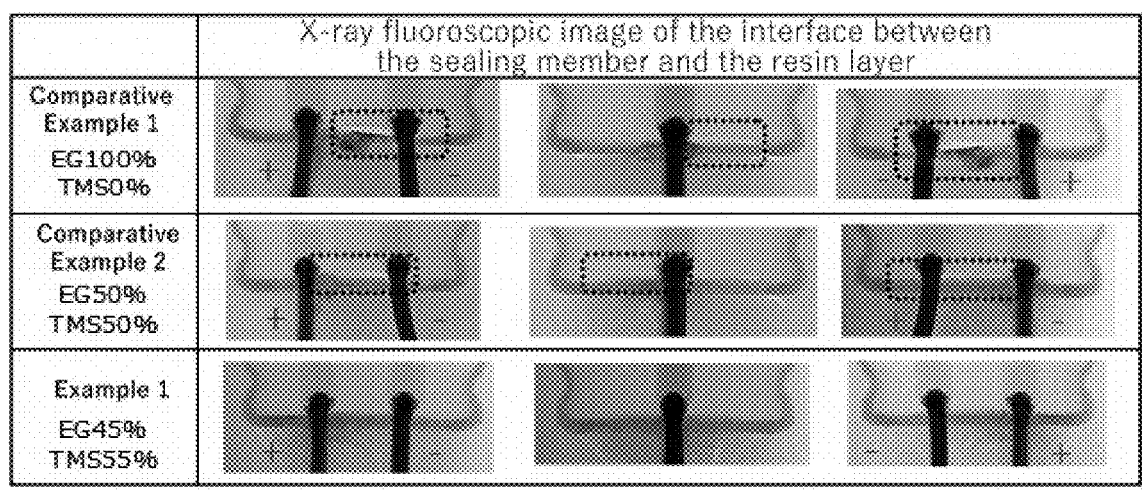
FIG. 2 is a fluoroscopic image taken from multiple directions of Comparative Example 1, Comparative Example 2, and Example 1.

Further, as shown in Table 2, according to the fluoroscopic image taken by the X-ray imaging device, cracks were generated in the resin layer of the acid anhydride-cured epoxy resin in which the electrolytic capacitors of Comparative Examples 1 to 3 were embedded. On the other hand, no crack could be found in the resin layer of the acid anhydride-cured epoxy resin in which the electrolytic capacitors of Examples 1 to 11 were embedded. Here, fluoroscopic images taken from multiple directions of Comparative Example 1, Comparative Example 2, and Example 1 are illustrated in FIG. 2. As shown in FIG. 2, in Comparative Examples 1 to 3, cracks are seen in the range surrounded by the dotted line. On the other hand, there are no cracks in each fluoroscopic image of Example 1. The area where cracks are observed is between the sealing member made of butadiene rubber and the resin layer of the acid anhydride-cured epoxy resin.

As a result, it was confirmed that the resin in the resin layer was decomposed when the ratio of ethylene glycol in the solvent was more than 45 wt %. Here, the electrolytic capacitors of Comparative Example 1 and Example 11 were housed in the aluminum container, filled with an epoxy resin, and then left as it is in a temperature environment of 150° C. for 400 hours. The main agent of the epoxy resin is bisphenol A type liquid epoxy resin, and the curing agent is tetrahydromethylphthalic anhydride, which is an acid anhydride type. After this heat leaving, the electrolytic solution was extracted from the electrolytic capacitors of Comparative Examples 1 and 11 and filtered, and high performance liquid chromatography was used to test whether a substance derived from the resin layer was detected in the electrolytic solution. The results are shown in Table 3.

TABLE 3

| | Ratio of Electrolytic Solution Solvent | | Detection of Resin- |
| --- | --- | --- | --- |
| | EG | GBL | Derived Components |
| Comparative Example 1 | 100 | 0 | Detected |
| Example 11 | 0 | 100 | Not detected |

In Table 3, EG indicates ethylene glycol and GBL indicates γ-butyrolactone. An electrolytic solution was prepared and a reference chromatograph was obtained by high performance liquid chromatography when only the electrolytic solution was used, when the chromatograph obtained by analyzing Comparative Example 1 and Example 11 had a peak not seen in the reference chromatograph, it was considered that the resin-derived components were detected. As shown in Table 3, components derived from the resin layer were detected in Comparative Example 1. On the other hand, no component derived from the resin layer was detected in Example 11.

From each of the above results, since the resin in the resin layer is an acid anhydride-cured epoxy resin with ester bonds and ethylene glycol is a compound with hydroxy group, it is understood that the acid anhydride-cured epoxy resin is decomposed by hydrolysis, the decomposition products react with ethylene glycol which is a compound with hydroxy group, these reaction products are eluted in the electrolytic solution, and the resin layer-derived components in the electrolytic solution increases ESR.

When the epoxy resin with ester bonds is used as the resin layer, or at least when the acid anhydride-cured epoxy resin is used as the resin layer, the amount of the compound with hydroxy group is suppressed to 45 wt % or less with respect to the total amount of the solvent in the electrolytic solution. As a result, it can be understood that the components derived from the resin layer do not elute into the electrolytic solution, and the increase in ESR is suppressed.

Examples 12 to 19

Next, the electrolytic capacitors of Examples 12 to 19 were manufactured. In Examples 12 to 19, azelaic acid was added to the electrolytic solution as the anionic component of the solute, and ammonia was added to the electrolytic solution as the cationic component of the solute. The electrolytic capacitors of Examples 12 to 19 have different amounts of cationic components in the solute in the electrolytic solution. The electrolytic capacitors of Examples 12 to 19 were housed in aluminum containers having the same dimensions as Examples 1 to 11, and were completely embedded with the same acid anhydride-cured epoxy resin as Examples 1 to 11. In addition, the electrolytic capacitors of Examples 12 to 19 were manufactured by the same manufacturing method and under the same conditions as those of Examples 1 to 11.

After filling each electrolytic capacitor of Examples 12 to 19 with an acid anhydride-cured epoxy resin, the electrolytic capacitor was left as it is for 800 hours in a temperature environment of 150° C. while applying a constant voltage of 35 V to each electrolytic capacitor. The ESR before and after this heat stress load were measured, and rate of change in ESR after heat stress load is calculated. ESR was measured at 100 kHz.

Table 4 below shows the composition and addition amount of the electrolytic solutions of Examples 12 to 19, and ESR (initial ESR) before heat stress load, ESR after heat stress load (post-test ESR), and rate of change in ESR after heat stress load. The amount of the solvent in Table 4 indicates the content with respect to the total solvent, and the amount of the solute in Table 4 is converted per 100 g of the electrolytic solution. The electrolytic capacitors of Examples 12 to 19 are of a winding type with a diameter of 6 mm and a total length of 6 mm, have a rated voltage of 35 V, and have a rated capacity of 47 µF.

24% with respect to the electrolytic capacitor of Example 18 having 76 mmol of ammonia. Furthermore, the change rate of ESR of the electrolytic capacitor of Example 14 having 25 mmol of ammonia was suppressed to about 18% with respect to the electrolytic capacitor of Example 17 having 51 mmol of ammonia.

As described above, when the electrolytic capacitor has the resin layer, the cationic component tends to promote the dedoping reaction and increase the ESR. However, it was confirmed that the increase in ESR can be suppressed by adjusting the cationic component to 76 mmol or less per 100 g of the electrolytic solution, and the increase in ESR can be further suppressed by adjusting the cationic component to 51 mmol or less per 100 g of the electrolytic solution, ESR after heat stress load can be further suppressed by adjusting the cationic component to 25 mmol or less per 100 g of the electrolytic solution.

Examples 20 to 23

The electrolytic capacitors of Examples 20 to 23 and Comparative example 4 were manufactured. The electrolytic solutions of Examples 20 to 23 and Comparative Example 4 have different ratios of sulfolane in the solvent. Sulfolane is an example of a compound that has no hydroxy group and no ether bond. In the electrolytic capacitors of Examples 20 to 23 and Comparative Example 4, no solute was added from the viewpoint of clarifying the influence of only the solvent of the electrolytic solution. In addition, the electrolytic capacitors of Examples 20 to 23 and Comparative Example 4 were housed in aluminum containers of the same size and completely embedded with the acid anhydride cured epoxy resin, and were manufactured by the same manufacturing method and under the same conditions as those of Examples 1 to 11.

After filling with the acid anhydride-cured epoxy resin, each electrolytic capacitor was left as it is for 5500 hours in a temperature environment of 150° C. The tan δ before and after this heat stress load were measured, and rate of change in tan δ after heat stress load is calculated.

Table 5 below shows the composition and addition amount of the electrolytic solutions of Examples 20 to 23 and Comparative Example 4, and tan δ (initial tan δ) before heat stress load, tan δ after heat stress load (post-test tan δ), and rate of change in tan δ after heat stress load. Note that the electrolytic capacitor of each Examples and Comparative Example is of a winding type with a diameter of 10 mm and a total length of 10 mm, have a rated voltage of 35 V, and have a rated capacity of 270 µF.

TABLE 4

|  | Solvent in Electrolytic Solution (Wt %) | | Solute in Electrolytic Solution (mmol) | | Initial ESR (Ω) | Post-test ESR (Ω) | ⊿ESR (%) |
| --- | --- | --- | --- | --- | --- | --- | --- |
|  | Ethylene glycol | Sulfolane | Azelaic acid | Ammonia |  |  |  |
| Example 12 | 40 | 60 | 4 | 4 | 0.066 | 0.082 | 24 |
| Example 13 |  |  | 17 | 17 | 0.066 | 0.10 | 59 |
| Example 14 |  |  | 25 | 25 | 0.073 | 0.13 | 72 |
| Example 15 |  |  | 34 | 34 | 0.069 | 0.16 | 137 |
| Example 16 |  |  | 42 | 42 | 0.071 | 0.25 | 252 |
| Example 17 |  |  | 51 | 51 | 0.071 | 0.36 | 405 |
| Example 18 |  |  | 76 | 76 | 0.071 | 1.25 | 1668 |
| Example 19 |  |  | 86 | 86 | 0.071 | 2.24 | 3056 |

As shown in Table 4, the change rate of ESR of the electrolytic capacitor of Example 18 having 76 mmol of ammonia was suppressed to about 55% with respect to the electrolytic capacitor of Example 19 having 86 mmol of ammonia as the cationic component. Furthermore, the change rate of ESR of the electrolytic capacitor of Example 17 having 51 mmol of ammonia was suppressed to about

TABLE 5

| | Solvent Ratio of Electrolytic Solution (Wt %) | | | Initial tanδ | Post-test tanδ | Δ tanδ (%) |
|---|---|---|---|---|---|---|
| | Ethylene glycol | γ-Butyrolactone | Sulfolane | | | |
| Comparative Example 4 | 100 | 0 | 0 | 0.025 | 0.234 | 837 |
| Example 20 | 30 | 70 | 0 | 0.025 | 0.110 | 340 |
| Example 21 | 30 | 35 | 35 | 0.025 | 0.080 | 220 |
| Example 22 | 40 | 0 | 60 | 0.026 | 0.061 | 135 |
| Example 23 | 0 | 0 | 100 | 0.027 | 0.056 | 106 |

As shown in Table 5, the electrolytic solution of Comparative Example 4 consisted only of ethylene glycol with hydroxy group, and the electrolytic solutions of Examples 22 and 23 have reduced ratios of ethylene glycol and an increase in sulfolane instead of a decrease in ethylene glycol. The electrolytic solution of Example 23 is composed only of sulfolane with neither hydroxy group nor ether bond. Comparing Comparative Example 4, Example 22 and Example 23, it can be confirmed that when ethylene glycol is reduced and the ratio of sulfolane is increased, the increase in tan δ is suppressed before and after the heat stress load.

Further, in Example 20 and Example 21, the amount of ethylene glycol was the same and the amount of γ-butyrolactone was changed, and in Example 21, sulfolane was added instead of reducing the amount of γ-butyrolactone from Example 20. Comparing Example 20 and Example 21, it can be confirmed that when sulfolane is added at a ratio of 35 wt % or more with respect to the total amount of the solvent in the electrolytic solution, the increase in tan δ is suppressed before and after the heat stress load.

In this way, by reducing the amount of the compound with ether bond as well as the compound with hydroxy group from the electrolytic solution, and instead, adding sulfolane with neither hydroxy group nor ether bond in an amount of 35 wt % or more with respect to the total amount of the solvent in the electrolytic solution, it can be understood that the components derived from the resin layer are not further eluted in the electrolytic solution, and the deterioration of the characteristics of the electrolytic capacitor is further suppressed.

The invention claimed is:

1. An electrolytic capacitor, comprising:
   a capacitor element including an anode foil, a cathode foil, and electrolytic solution,
   a case housing the capacitor element,
   a sealing member sealing the case, and
   a resin layer arranged in the vicinity of the sealing member,
   wherein the resin layer includes ester bond and epoxy resin composition, and
   an amount of compounds with hydroxy group is 10 wt % or more and 45 wt % or less in solvent of the electrolytic solution.

2. The electrolytic capacitor according to claim 1, wherein the epoxy resin composition uses an epoxy resin and an acid anhydride curing agent as raw materials.

3. The electrolytic capacitor according to claim 2, wherein the compound with hydroxy group is ethylene glycol, diethylene glycol, or polyethylene glycol.

4. The electrolytic capacitor according to claim 2, wherein the electrolytic solution contains 35 wt % or more of sulfolane with respect to the total amount of the solvent of the electrolytic solution.

5. The electrolytic capacitor according to claim 2, wherein the capacitor element further comprises a solid electrolyte.

6. The electrolytic capacitor according to claim 5, wherein cationic component in the electrolytic solution is contained in an amount of 76 mmol or less per 100 g of the electrolytic solution.

7. The electrolytic capacitor according to claim 5, wherein cationic component in the electrolytic solution is contained in an amount of 25 mmol or less per 100 g of the electrolytic solution.

8. The electrolytic capacitor according to claim 1, wherein the epoxy resin composition has a chemical structure containing an epoxy resin and an acid anhydride curing agent.

9. The electrolytic capacitor according to claim 1, wherein the compound with hydroxy group is ethylene glycol, diethylene glycol, or polyethylene glycol.

10. The electrolytic capacitor according to claim 1, wherein the electrolytic solution contains 35 wt % or more of sulfolane with respect to the total amount of the solvent of the electrolytic solution.

11. The electrolytic capacitor according to claim 10, wherein the capacitor element further comprises a solid electrolyte.

12. The electrolytic capacitor according to claim 11, wherein cationic component in the electrolytic solution is contained in an amount of 76 mmol or less per 100 g of the electrolytic solution.

13. The electrolytic capacitor according to claim 1, wherein the capacitor element further comprises a solid electrolyte.

14. The electrolytic capacitor according to claim 13, wherein cationic component in the electrolytic solution is contained in an amount of 76 mmol or less per 100 g of the electrolytic solution.

15. The electrolytic capacitor according to claim 13, wherein cationic component in the electrolytic solution is contained in an amount of 25 mmol or less per 100 g of the electrolytic solution.

* * * * *